Jan. 6, 1942.　　　D. B. GREEN ET AL　　　2,268,705
MAXIMUM DEMAND METER RECORDING ATTACHMENT
Filed Aug. 5, 1939
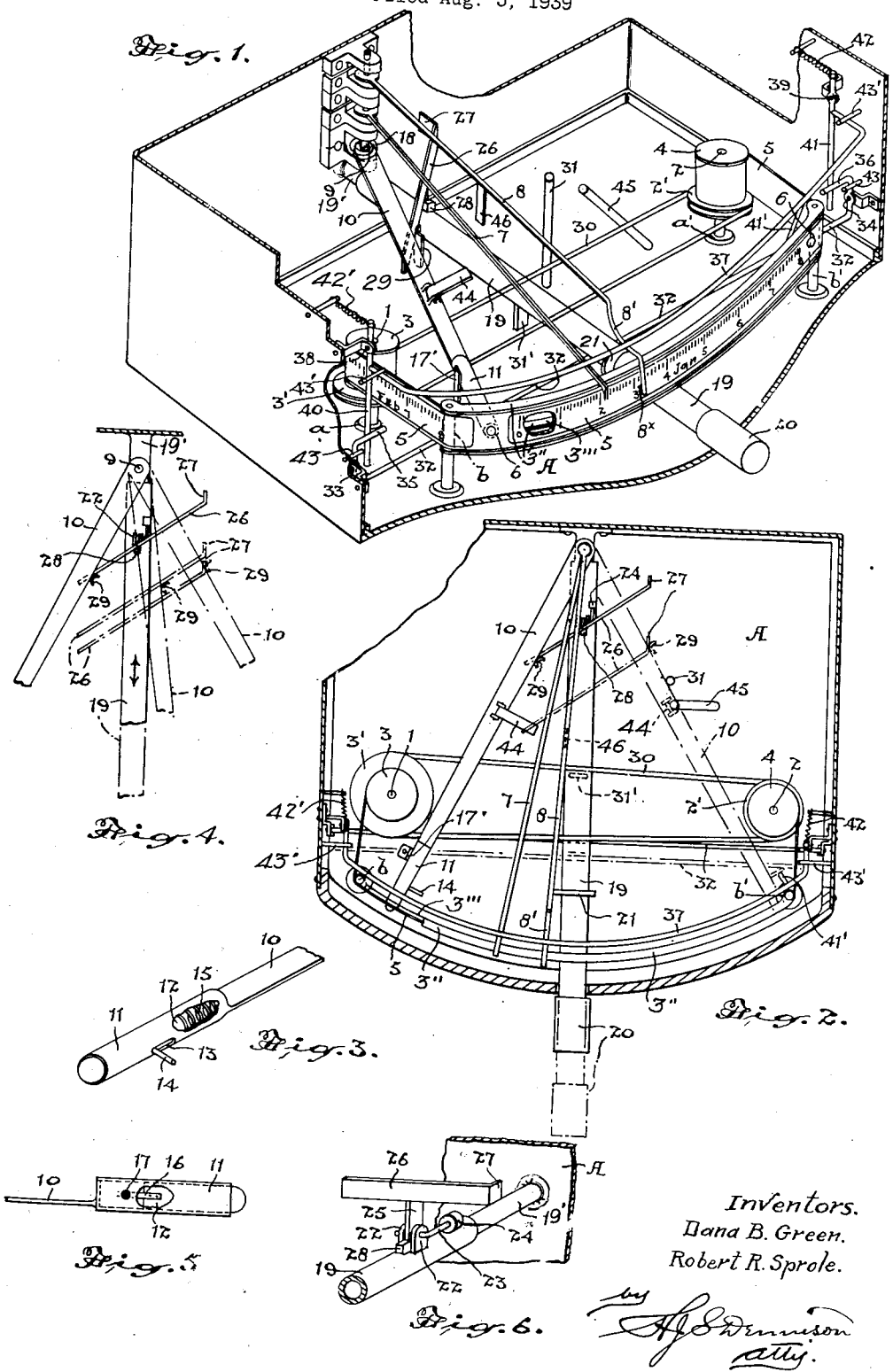
Inventors.
Dana B. Green.
Robert R. Sprole.

Patented Jan. 6, 1942

2,268,705

UNITED STATES PATENT OFFICE 2,268,705

MAXIMUM DEMAND METER RECORDING ATTACHMENT

Dana B. Green and Robert R. Sprole, Ithaca, N. Y., assignors to Therm-Electric Meters Company Incorporated, Ithaca, N. Y.

Application August 5, 1939, Serial No. 288,492

10 Claims. (Cl. 234—58)

This invention relates particularly to electrical demand meters and the principal object is to provide an attachment for such meters which will enable the keeping of an accurate record of the maximum demand of current over definite predetermined periods in order that the user of electric energy may be protected against inaccurate or careless recording by the meter reader and that the power company may be able to check the work of the meter readers and satisfy the user in respect to charges made.

Numerous devices in the form of cumulative demand registers using an odometer mechanism are being used for checking purposes but such devices do not fulfill the requirements as they do not indicate directly the demand but merely show, after each reading and resetting, a series or combination of numbers which is an addition of previous records.

The principal feature of the present invention consists in the novel provision of a chart having definite time periods arranged in markings thereon and means for definitely marking said chart to record the position of the demand indicator of the meter at the time of reading, such means being operable to move the chart and to bring the maximum demand indicator into contact with the chart to effect the definite recording of its position at the time of reading.

In the accompanying drawing

Figure 1 is a skeleton perspective view of the preferred improved recording mechanism.

Figure 2 is a sectional plan view of the mechanism illustrated in Figure 1.

Figure 3 is a sectional elevational detail of the retractible contact end of the chart-moving member.

Figure 4 is a diagrammatic plan view of the means for swinging the chart-moving member.

Figure 5 is a plan detail in part section of the retractible contact end of the chart-moving member showing the means for temporarily locking the retractible portion in the return movement after having moved the chart.

Figure 6 is a detail perspective view of a suitable form of contact means for swinging the chart-moving member.

In the form of construction herein shown the bottom of the meter casing A has secured in bosses $a$ and $a'$ the vertical spindles 1 and 2 upon which are rotatively mounted respectively the flanged rollers 3 and 4. A ribbon 5, of specially prepared waxed paper or other suitable material capable of receiving an impression thereon, is wound on the roller 3 and extends over rollers $b$ and $b'$ and a suitable arc-shaped backing plate 3" broken away in part suitably supported from the casing, and the end is secured to the roller 4. This ribbon has printed thereon a suitable scale, preferably arranged in monthly sequence, each month's scale representing the measurement of electrical units. Between the adjacent monthly or period scales is arranged a perforation 6, the purpose of which will hereinafter appear.

The meter indicator arms 7 and 8 represent the ordinary indicators of a standard maximum demand meter, the arm 7 being the "pusher" and the arm 8 being the maximum "demand" indicator or element. The arms 7 and 8 are so arranged at their pointer ends that the indicator arm 7 in moving in the up-scale direction engages the end of the maximum "demand" indicator arm 8, thus advancing same therewith to the point of highest indication reached by the indicator arm where it will remain until either advanced farther by the action of arm 7, or until returned manually as hereinafter defined. The arm 8 is formed with a flexible end 8' and the downturned "pointer" end is provided with a scoring or marking edge and a point 8× which extends downwardly below the scale markings for the purpose of applying a definite marking to the ribbon as will hereinafter appear and such marking may be either of a surface character or in the nature of a scratch or perforation on the wax surface in the case of a wax-coated ribbon.

None of the meter-actuating mechanism for the indicator arms is shown, these being operated by any of the usual meter devices, the invention as described herein being applicable to a thermal maximum demand watt meter, a thermal maximum demand ampere meter by suitable modification of the design, or to other types of indicating maximum demand meter.

A spindle 9, mounted vertically in suitable bearings supported from the meter casing A supports an arm 10, the outer end 11 thereof being in the form of a cylinder. Within the cylinder 11 is slidably mounted a piston 12, the outer end of which is rounded and protrudes through a slot 3''' extending from end-to-end of the backing plate 3" so as to engage the perforations 6 in the scale ribbon 5 overlying said plate to propel the ribbon in the operation of changing the monthly or period scales. The wall of the cylinder 11 is formed with a longitudinal slot 13 through which a pin 14, secured to the piston 12, extends. A coiled compression spring 15 is arranged within the cylinder and exerts an outward thrust on the piston 12 (as illustrated in Fig. 3). The piston 12 has secured thereto a small flat spring 16 which carries a small pin 17 at its free end which is adapted to slip into a small orifice in the cylinder to lock the piston in its inward position during its return stroke after having moved the scale ribbon the required distance.

The return movement of the arm 10 and the cylinder and piston carried thereby is effected by means of a coiled spring 18, one end of which is secured to the arm 10 and the other end to the meter casing.

A pin or fixed spindle 19' is rigidly mounted in a horizontal position in the meter casing and extends forwardly and has slidably and non-rotatably mounted thereon a sleeve 19 which extends outwardly through the front of the meter case below the recording ribbon 5 and has a knob 20 on its outer end by means of which the person reading the meter operates the mechanism for recording the position of the maximum demand pointer. The pin 19' and sleeve 19 are spaced sufficiently below the backing plate 3" so that a flange 21 on the sleeve will pass under the plate 3", which flange is adapted to engage the forward wall of the casing to limit the outward movement of the sleeve.

The sleeve 19 is provided near its inward end with a pair of lugs 22 in which a cranked spindle 23 is rotatably mounted, said spindle having a counter-weight 24 on its crank end. Secured to the spindle 23 between the lugs 22 is an arm 25 which extends upwardly and has mounted on its upper end an angularly disposed bar 26 which extends horizontally and in diagonal relation to the axis of the sleeve 19. The inward or back end 27 of the bar is formed at an obtuse angle to the main portion of the bar. The lower end of the arm 25 abuts a stop 28 secured on top of the sleeve at the forward side of said arm and prevents the bar 26 from swinging backward while allowing it to swing forwardly.

The arm 10 has mounted thereon an ear or lug 29 provided with a curved vertical side which is engaged by the angularly disposed bar 26 so that when the sleeve 19 is moved outwardly the diagonal plane of the bar pushing against the upright ear 29 on the arm 10 causes the arm 10 to swing horizontally so that the rounded outer end of the piston, extending into the perforation 6 in the scale ribbon, pulls the said ribbon a distance sufficient to unroll a new period scale from the roller 3 and wind up the preceding period scale upon the roller 4.

The roller 4 is provided with a grooved pulley 2' and the roller 3 is provided with a grooved pulley 3'. An endless belt 30 extends around the pulleys 2' and 3' and, in practice the pulley 2' will be of sufficiently smaller diameter than the pulley 3' to impart sufficient overdrive to the pulley 2' and roller 4 so that the ribbon will at all times be drawn taut between the rollers 3 and 4 irrespective of the relative quantities of the ribbon on the respective rollers, the belt 30 being adapted to slip to the required extent as the ribbon retards rotation of the pulley 2' and roller 4. This action not only keeps the ribbon taut but also keeps the ribbon wound tightly on the rollers 3 and 4.

The movement of the arm 10 is limited in any suitable manner here shown by a stop 31 located on the meter frame in order to ensure the arresting of each monthly scale section of the ribbon 5 in proper position for accurate co-operation with the meter-actuated elements. This stop is arranged to arrest the arm 10 as the ear 29 clears the diagonally disposed portion of the bar 26 and the portion 27 holds the arm 10 while the sleeve 19 is pulled further outward to effect the marking of the ribbon by co-operation with the mechanism to be now defined.

In this latter portion of the outward movement of the sleeve 19 a spring ear 31' mounted thereon and extending downwardly therefrom engages a bar 32 which extends horizontally below the ribbon. The bar 32 is turned upwardly at the ends and these upturned ends are supported on pivots 33 and 34 in the meter frame. The upturned ends of the bar 32 are turned inwardly parallel with the said bar forming the crank ends 35 and 36.

A bail 37, supported on pivots 38 and 39 on the meter frame is shaped to conform to the shape of the ribbon extending between the rollers b and b' and is adapted to engage the spring end 8' of the demand indicator arm 8. Rods 40 and 41 extend downwardly from the pivot ends of the bar 37 and these arms are engaged by the crank ends 35 and 36 of the bar 32 when said bar is engaged and swung forwardly by the spring ear 31'.

Light coil springs 42 and 42', connected to the meter frame and to extensions of the rods 40 and 41, act to normally raise the bail 37 from contact with the indicator 8 and also to return the bar 32 to its normal position against the lower stops 43 when the sleeve 19 is pushed inward at the completion of the operation, the spring ear 31' retreating from the bar 32 as bail 37 engages the adjacent upper stops 43' on the frame.

The downward pressure of the bar 37 against the flexible end 8' of the "maximum" pointer or element 8 causes the downturned marking end 8ˣ of the pointer to mark the ribbon 5 at the position such pointer occupies in relation to the scale on the ribbon and thus definitely marks the record of the "demand" reading.

As the bail 37 reaches its downward limit of movement the bar 41', which is rigid with the bail 37, engages the pin 14 secured to the piston in the cylinder 11 and forces the piston back against the pressure of the spring 15, thereby withdrawing the rounded end of the piston from the perforation in the ribbon. Simultaneously the pin 17, mounted on the spring 16 secured to the piston, slips into a hole provided in the cylinder and locks the piston in its retracted position so that the arm 10 may be returned independent of the ribbon to its normal-position when released as hereinafter pointed out. The bar 26, here shown pivotally mounted on the sleeve 19, may be so positioned that when the ear 29 reaches the dotted line position of Figure 2 in engagement with the end portion 27 of bar 26, the ribbon-advancing displacement will be completed and further outward displacement of the sleeve 19 will cause the portion 27 to ride clear of the ear 29 to the rear thereof, thereby freeing the arm 10 to return in its zero-resetting movement to normal position. The arm 10 being freed then swings back to its normal position through the action of the coiled spring 18 and as the said arm reaches the limit of its return movement the lock pin 17 engages a stop 17' and is released to allow the piston to again move outwardly to enter another perforation in the ribbon 5 ready to again move the ribbon in a succeeding operation.

The arm 10 has pivotally mounted thereon between a pair of lugs an ear 44 which is held frictionally in angular relation to the vertical and, at the end of the ribbon-advancing movement of said arm said ear engages a stop 45 on the frame and is swung upwardly to a vertical position. On the return movement of the arm 10 the vertically positioned ear 44 engages a lug 46 on the maximum demand pointer arm 8 and the frictional resistance to swinging of the ear 44 on the arm 10 is slightly greater than required to ensure the return of the maximum demand pointer 8 and the regular pusher indicator 7 to their zero positions. On reaching the zero scale position the indicator arm 7 and arm 8 will, on engaging the usual zero stop means, be arrested but the arm 10 under action of the spring 18 will swing farther thus causing the ear 44, by engagement with the now stationary lug 46, to swing in opposition to its frictional resistance to its angular position where it will be frictionally held as aforesaid.

As the sleeve 19 is returned to its inward position the inward face of the bar 26 striking the ear 29 causes the bar to tip forwardly on its axis. The bar 26 then rides under and passes the ear 29 and after passing thereunder the bar is brought back to its normal position by the counter-weight 24 so that the ear 29 will then be positioned in front of the bar 26 ready to cooperate therewith on the next resetting operation of the sleeve 19.

The mechanism operated as described accomplishes, with a single pull-push operation of the operating knob 20; first, the removal of a time period scale, such as one month, from view bringing the succeeding time period scale into view; second, marks the newly appearing scale with the maximum demand, leaving this record in full view until the next reset period; third, resets the maximum demand hand against the indicating hand and effects zero resetting.

A device such as described will eliminate many of the undesirable practices known to be indulged in by men reading meters and it will afford a positive and definite permanent record which may be produced at any time.

Many modifications to the structure herein shown may be made without departing from the principal features as defined in the claims.

What we claim as our invention is:

1. A maximum demand recording attachment for electric meters of the type having a maximum demand element and a pointer element displaceable relative to said demand element to indicate instantaneous demand and being engageable with the maximum demand element to displace same to a position to indicate the maximum demand over a given period, and said recording attachment including means for supporting a movable chart having definite time period markings, with means for permanently recording the position of said maximum demand element only on said chart, the combination therewith of, a member displaceable with an advance and return movement, means effective only during the advance movement of said member to advance said chart including means for dis-associating the same from said chart at the end of the chart-advancing displacement, and means co-operatively associated with said latter means for resetting said maximum demand element to the zero-scale position on the return displacement of said displaceable member only after its maximum demand position has been recorded.

2. In a maximum demand recording attachment for electric meters of the type having a pointer-actuated maximum demand element adapted to be reset at regular intervals, means for supporting a movable chart having definite time period markings, and means for displacing the maximum demand element into marking contact with said chart, the combination therewith of, a member mounted to swing in an advance and return direction, means for advancing the chart as the said member is displaced in its advance direction, means for resetting said maximum demand element in response to the return movement only of said member, a manually operable reciprocable means, and means subject to the reciprocable operation of said manual means for controlling said member.

3. A recording indicating demand attachment for electric meters of the type having a pivotally mounted pointer and pointer actuated maximum demand element comprising in combination, means for supporting a chart of ribbon form in an arcuate path concentric with the pivot axes of the pointer and demand element, an arm pivotally mounted on an axis aligned with the aforesaid axes and adapted to engage and feed said chart in said arcuate path as it is swung on its pivot to replace one time period thereof with a successive time period, manual means for swinging said arm, means operated by said manual means for displacing said maximum demand element only into marking engagement with said chart, and means for returning said maximum demand element to zero position during the operation of said manual means and only after the marking displacement thereof.

4. Apparatus as claimed in claim 3 in which said manual means includes a member mounted for sliding displacement radially of the said pivot axes, and cam means operatively interposed between said pivotally mounted arm and said radially slidable member to swing said arm on radial displacement of the latter.

5. A maximum demand recording attachment for electric meters of the type having a pointer-actuated maximum demand element adapted to be reset at regular intervals including in combination, means for supporting a chart of ribbon form stretched between rollers, the chart having perforations arranged between definite time period markings, a pivotal arm having a retractible end adapted to enter said perforations, means for swinging said pivotal arm a predetermined distance, means for moving said maximum demand element into marking engagement with said chart, means for retracting said chart-engaging member clear of the chart, means for returning said pivotal arm to normal position, and means carried by said pivotal arm for engaging said maximum demand element during the return movement of said arm only to return said maximum demand element to its zero position.

6. A maximum demand recording attachment for electric meters comprising in combination with a meter having a maximum demand element: spaced rollers, means for supporting a chart of ribbon form stretched between said rollers, a pivotal arm adapted to engage and feed said chart from one roller to the other a definite time period distance, a slidable member having means for engaging and swinging said pivotal arm, a pivotal bail arranged to be swung into engagement with said maximum demand element to mark said chart and having rod extensions, a cranked bar adapted to engage the rod extensions of said bail member, and means on said slidable member for swinging said cranked bar to operate said bail.

7. A maximum demand recording attachment for electric meters comprising in combination with a meter having a maximum demand element: spaced rollers, means for supporting a chart of ribbon form stretched between said rollers, a pivotal arm adapted to engage and advance said chart from one roller to the other a definite time period distance and having a projecting ear, a slidable member having a diagonally arranged bar mounted thereon to engage said ear to swing said pivotal arm, and means operated by said slidable member for moving said maximum demand element into marking contact with said chart.

8. A device as claimed in claim 7 in which said maximum demand element is formed with a lug extension, an ear frictionally pivoted on said pivotal arm to assume either an angular position or a vertical position and adapted when in the inclined position to pass clear of said lug extension as the arm is swung in the chart-advancing direction, means for tilting said frictionally pivoted ear into its vertical position at the end of the chart-advancing movement of said arm for operative engagement with said lug extension on the return movement of the arm, means for disengaging said arm from the ribbon-like chart at the end of its chart-advancing movement, and means for returning said arm.

9. A device as claimed in claim 7 in which said pivotal arm is provided with a cylindrical end having a longitudinal slot therein, a piston being slidably mounted in said cylinder having a rounded outer end adapted to enter perforations in said chart, said piston having a pin extending through said slot, means for engaging said pin at the end of the chart-advancing movement of said pivotal arm to retract said piston from the perforation, a spring in said cylinder to force said piston outwardly to engage the chart, means for locking the piston in the retracted position, to permit return swinging of the arm independent of the chart, means for resetting the maximum demand element to zero on the return swinging of said arm, and means for releasing said lock at the end of the return swinging movement of said arm to effect re-engagement of the rounded outer end of said piston with a perforation in the chart.

10. A device as claimed in claim 7 in which said pivotal arm is provided with a cylindrical end having a hole arranged therein, a piston slidably mounted in said cylindrical end, spring means for urging said piston outwardly to engage said chart, a spring mounted on said piston having a pin adapted to enter the hole in said cylinder to lock the piston in a retracted position, to permit return swinging of the arm independent of the chart, means for resetting the maximum demand element to zero on the return swinging of said arm, and means adapted to engage said pin and release it from its locking position at the end of the return swinging movement of said arm to permit re-engagement of said piston with the chart.

DANA B. GREEN.
ROBERT R. SPROLE.